(12) United States Patent
Miller

(10) Patent No.: US 9,974,293 B2
(45) Date of Patent: May 22, 2018

(54) FISHING DEVICE

(71) Applicant: James Calvin Miller, Portland, TN (US)

(72) Inventor: James Calvin Miller, Portland, TN (US)

(73) Assignee: James Calvin Miller, Portland, TN (US)

( * ) Notice: Subject to any disclaimer, the term of this patent is extended or adjusted under 35 U.S.C. 154(b) by 1087 days.

(21) Appl. No.: 13/852,247

(22) Filed: Mar. 28, 2013

(65) Prior Publication Data

US 2014/0290117 A1    Oct. 2, 2014

(51) Int. Cl.
*A01K 93/02*     (2006.01)
*A01K 93/00*     (2006.01)

(52) U.S. Cl.
CPC .............. *A01K 93/02* (2013.01); *A01K 93/00* (2013.01)

(58) Field of Classification Search
CPC ................................ A01K 93/00; A01K 93/02
USPC ........... 43/17, 16, 44.88, 44.87, 44.95, 44.9, 43/44.91
See application file for complete search history.

(56) References Cited

U.S. PATENT DOCUMENTS

| | | | |
|---|---|---|---|
| 322,088 A * | 7/1885 | Behrens | 43/44.91 |
| 332,573 A * | 12/1885 | Tufts | A01K 93/00 43/44.91 |
| 751,734 A * | 2/1904 | Hymers | 43/15 |
| 1,317,496 A | 9/1919 | Sone | |
| 2,004,414 A * | 6/1935 | Menefee | 43/43.1 |
| 2,014,517 A * | 9/1935 | Beregow | A01K 83/00 43/43.11 |
| 2,128,899 A | 9/1938 | Barnhart | |
| 2,144,175 A * | 1/1939 | Zonn | 43/15 |
| 2,153,869 A * | 4/1939 | Jones | A01K 93/00 43/44.88 |
| 2,205,352 A * | 6/1940 | Fisher | 43/17 |
| 2,239,911 A * | 4/1941 | Dorn | 43/15 |
| 2,493,971 A * | 1/1950 | Johnson | 43/44.91 |
| 2,575,852 A * | 11/1951 | Trowbridge | 43/16 |
| 2,587,190 A * | 2/1952 | Merriweather | A01K 93/02 43/17 |
| 2,631,399 A * | 3/1953 | Sowa | 43/15 |
| 2,720,720 A * | 10/1955 | Landrum | A01K 93/00 43/43.11 |
| 2,779,112 A | 1/1957 | Garland | |
| 2,814,903 A | 12/1957 | Banowetz | |
| 2,825,175 A * | 3/1958 | Skvier | A01K 93/00 43/44.91 |

(Continued)

FOREIGN PATENT DOCUMENTS

| | | | | |
|---|---|---|---|---|
| DE | 3714124 A1 * | 11/1987 | | A01K 93/02 |
| FR | 2888722 A3 * | 1/2007 | | A01K 93/02 |

(Continued)

*Primary Examiner* — Darren W Ark
*Assistant Examiner* — Morgan T Barlow
(74) *Attorney, Agent, or Firm* — Seager, Tufte & Wickhem LLP

(57) ABSTRACT

A fishing bobber may include an elongate shaft having a first end, an opposing second end, and a longitudinal axis extending therebetween, a line retainer disposed at the first end, a counterweight float disposed proximate the second end, and an axially movable primary float disposed on the elongate shaft between the first end and the second end.

18 Claims, 16 Drawing Sheets

(56) References Cited

U.S. PATENT DOCUMENTS

| | | | | |
|---|---|---|---|---|
| 2,842,886 | A * | 7/1958 | Williams | A01K 93/00 43/44.87 |
| 2,876,578 | A * | 3/1959 | Argenio | A01K 93/02 43/15 |
| 2,887,816 | A | 5/1959 | Hudkins | |
| 2,931,124 | A | 4/1960 | Johnston | |
| 2,962,831 | A * | 12/1960 | Cameron | A01K 93/02 43/17 |
| 2,988,840 | A | 6/1961 | Seigle | |
| 3,303,598 | A * | 2/1967 | Spindler | 43/44.9 |
| 3,323,247 | A | 6/1967 | Murray | |
| 3,337,981 | A | 8/1967 | Bowman | |
| 3,364,614 | A * | 1/1968 | Huebotter | A01K 91/06 43/43.15 |
| 3,381,407 | A * | 5/1968 | McDougall | A01K 93/00 43/44.88 |
| 4,418,492 | A * | 12/1983 | Rayburn | 43/44.9 |
| 4,443,203 | A | 4/1984 | Maertens | |
| 4,486,969 | A * | 12/1984 | Swenson | 43/17 |
| 4,916,846 | A | 4/1990 | Pehm | |
| 5,199,205 | A * | 4/1993 | Klammer | 43/17 |
| 5,235,777 | A * | 8/1993 | Burns | 43/43.14 |
| 5,241,774 | A * | 9/1993 | Rayburn | 43/44.9 |
| 5,243,780 | A * | 9/1993 | Christensen | A01K 93/00 43/17.5 |
| 5,404,668 | A * | 4/1995 | Christensen | A01K 93/00 43/44.87 |
| 5,404,669 | A * | 4/1995 | Johnson | A01K 93/00 43/44.88 |
| 5,758,451 | A * | 6/1998 | Wolfe | A01K 93/00 43/44.88 |
| 6,009,659 | A * | 1/2000 | Shannon et al. | 43/44.91 |
| 6,073,386 | A * | 6/2000 | Firmin | 43/44.87 |
| 6,158,164 | A | 12/2000 | Mack et al. | |
| 6,173,524 | B1 * | 1/2001 | Kinchen, Sr. | 43/43.1 |
| D452,550 | S | 12/2001 | Storelli | |
| 6,389,737 | B1 * | 5/2002 | Larumbe Salinas | 43/44.87 |
| D460,802 | S | 7/2002 | Storelli | |
| D460,803 | S | 7/2002 | Storelli | |
| D469,155 | S | 1/2003 | Bill | |
| D472,957 | S | 4/2003 | Storelli | |
| 6,671,994 | B1 * | 1/2004 | Klein | 43/17 |
| 6,763,629 | B1 * | 7/2004 | Bennett | 43/16 |
| 6,763,630 | B1 * | 7/2004 | Jenkins | 43/17 |
| 6,880,283 | B2 * | 4/2005 | Holmes | 43/4.5 |
| 7,415,792 | B1 * | 8/2008 | Noble | 43/42.31 |
| 8,341,871 | B2 * | 1/2013 | Kavanaugh | 43/43.1 |
| 8,635,803 | B1 * | 1/2014 | Cartwright | 43/17 |
| 8,739,458 | B1 * | 6/2014 | Michael | 43/15 |
| 2005/0257419 | A1 * | 11/2005 | Weeda | A01K 91/20 43/44.87 |
| 2006/0213114 | A1 * | 9/2006 | Kumlin | A01K 93/00 43/43.14 |
| 2006/0254121 | A1 * | 11/2006 | Huynh | 43/44.95 |
| 2006/0283074 | A1 * | 12/2006 | Barrow et al. | 43/44.87 |
| 2006/0288633 | A1 * | 12/2006 | Fiferlick | A01K 93/00 43/44.92 |
| 2017/0027147 | A1 * | 2/2017 | Nichols | A01K 93/02 |

FOREIGN PATENT DOCUMENTS

| | | | | |
|---|---|---|---|---|
| GB | 2222753 | A * | 3/1990 | A01K 93/00 |
| GB | 2344267 | A * | 6/2000 | A01K 93/00 |
| GB | 2421883 | A * | 7/2006 | A01K 93/00 |
| GB | 2424813 | A * | 10/2006 | A01K 93/00 |
| JP | 05137488 | A * | 6/1993 | |
| JP | 08275702 | A * | 10/1996 | |
| JP | 10286050 | A * | 10/1998 | |
| JP | 2001008592 | A * | 1/2001 | |
| JP | 2001008593 | A * | 1/2001 | |
| JP | 2001103892 | A * | 4/2001 | |
| JP | 2002000148 | A * | 1/2002 | |
| JP | 2002191275 | A * | 7/2002 | |
| JP | 2008200018 | A * | 9/2008 | |
| JP | 2010200750 | A * | 9/2010 | |
| JP | 2010284122 | A * | 12/2010 | |
| JP | 2013247948 | A * | 12/2013 | |
| JP | 2014054206 | A * | 3/2014 | |
| WO | WO-9634524 | A1 * | 11/1996 | A01K 93/00 |

* cited by examiner

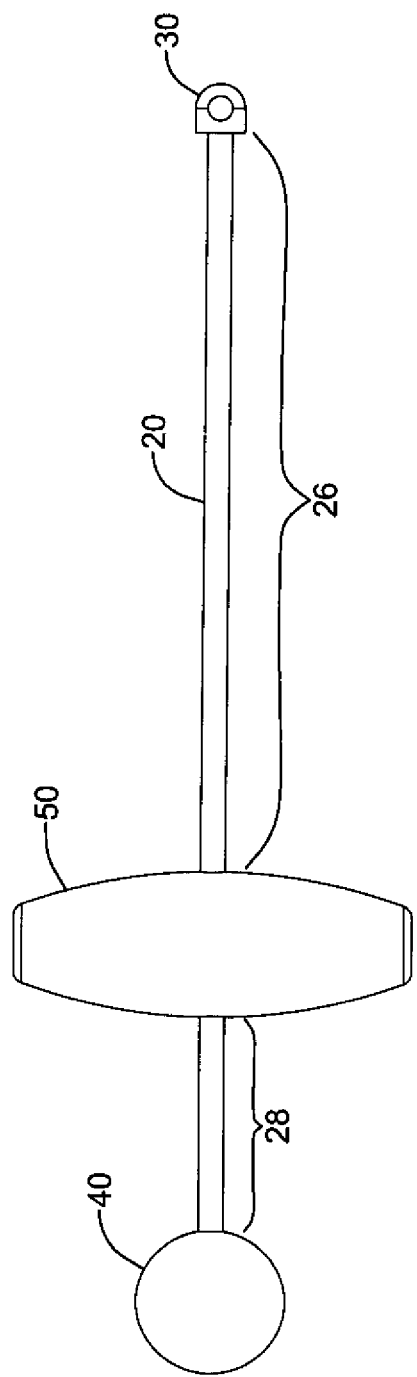

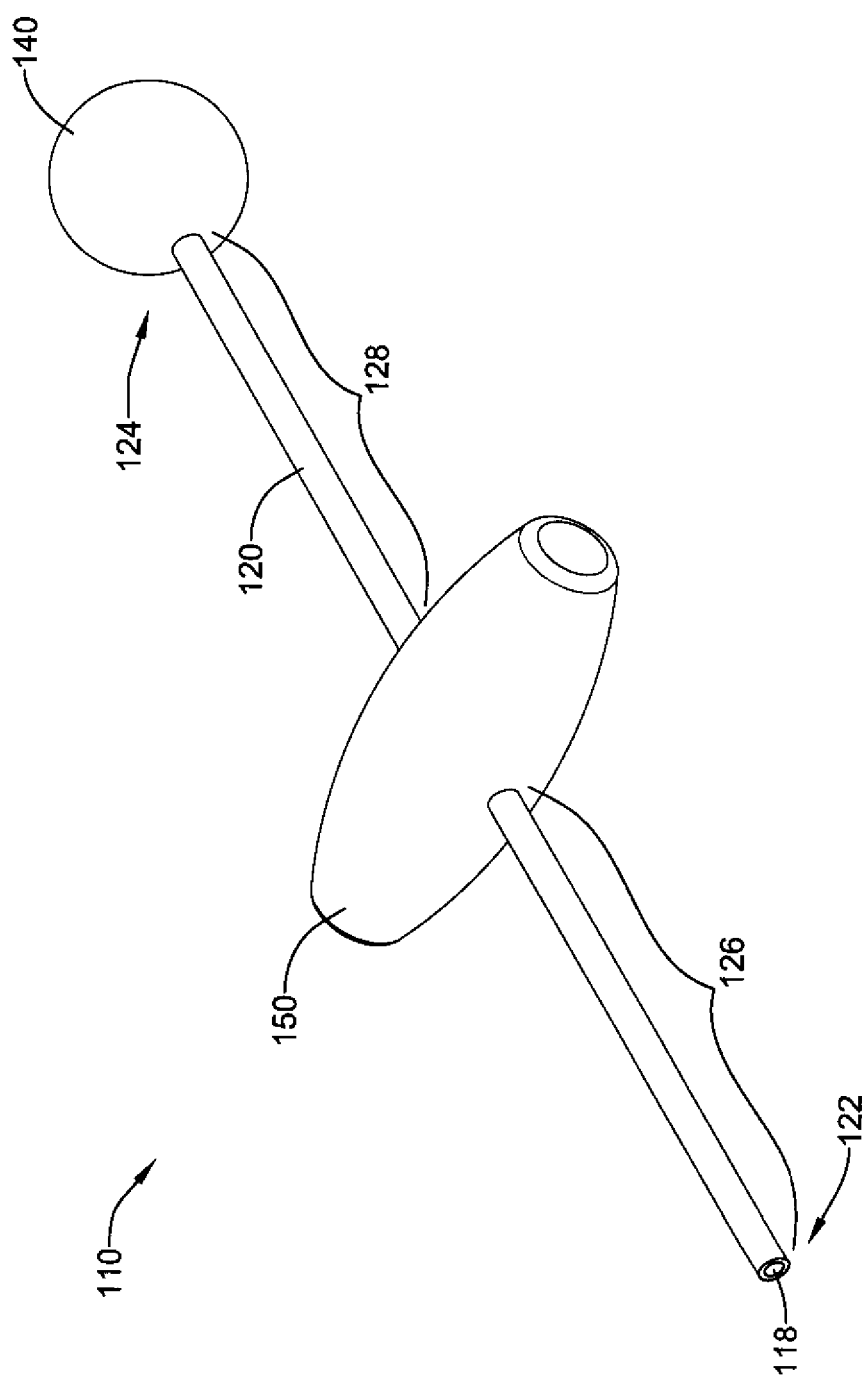

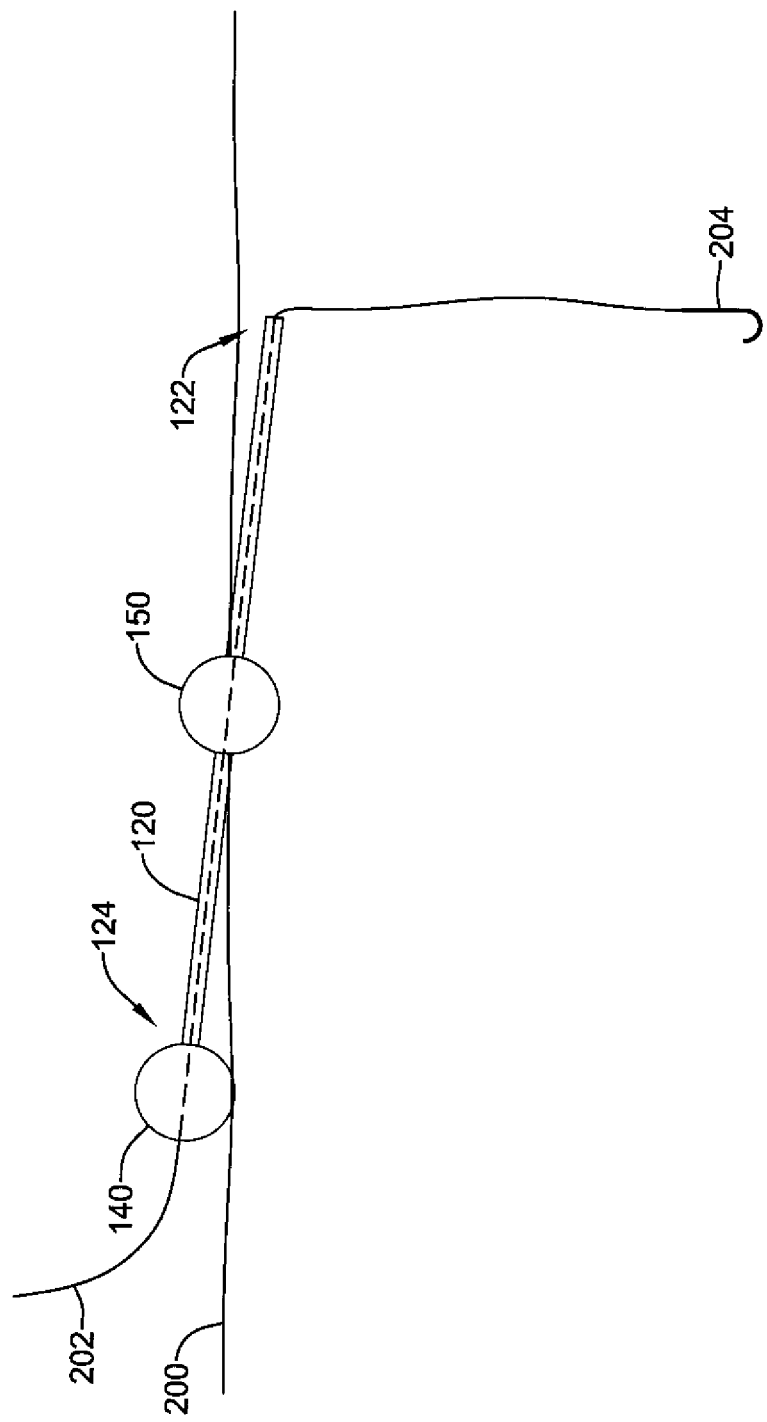

US 9,974,293 B2

FISHING DEVICE

TECHNICAL FIELD

The disclosure relates generally to fishing floats or bobbers and in particular to a fish strike indicator.

BACKGROUND

Fishing floats or bobbers may come in many different shapes and designs, including spherical, ellipsoid, and elongate stick or pencil bobbers, for example. Anglers may use a bobber to support a bait or lure suspended within a water column at a predetermined depth where fish are believed to be located, and/or as an indicator of a bite or strike by the fish. A bite or strike is typically detected by the disappearance or sinking of the bobber under the surface of the water. Often, the buoyancy of a bobber may make detection of very light bites particularly difficult. A continuing need exists for an improved bobber that is sensitive to very light bites.

SUMMARY

A fishing bobber having a center of mass may include an elongate shaft having a first end, an opposing second end, and a longitudinal axis extending therebetween, a line retainer disposed at the first end, a counterweight float disposed proximate the second end, and an axially movable primary float disposed on the elongate shaft between the first end and the second end.

A fishing bobber may include an elongate shaft having a first end and a counterweight float at an opposing second end, and a pivot float sized to support a bait or lure attached to a fishing line engaged with the elongate shaft, the pivot float defining a pivot axis movable along the elongate shaft, wherein the pivot float defines a first portion of the elongate shaft between the first end and the pivot float and a second portion of the elongate shaft between the second end and the pivot float, further wherein the first portion is longer than the second portion, wherein the counterweight float is sized and weighted to cooperate with the pivot float to offset a combined weight of the first portion of the elongate shaft and the bait or lure when situated in water, thereby establishing a center of mass at the pivot axis.

BRIEF DESCRIPTION OF THE DRAWINGS

FIG. 7 illustrates an example bobber configuration;
FIG. 9 is a perspective view of an example bobber;
FIG. 10 illustrates an example bobber in use on the water surface.

Figure 1:
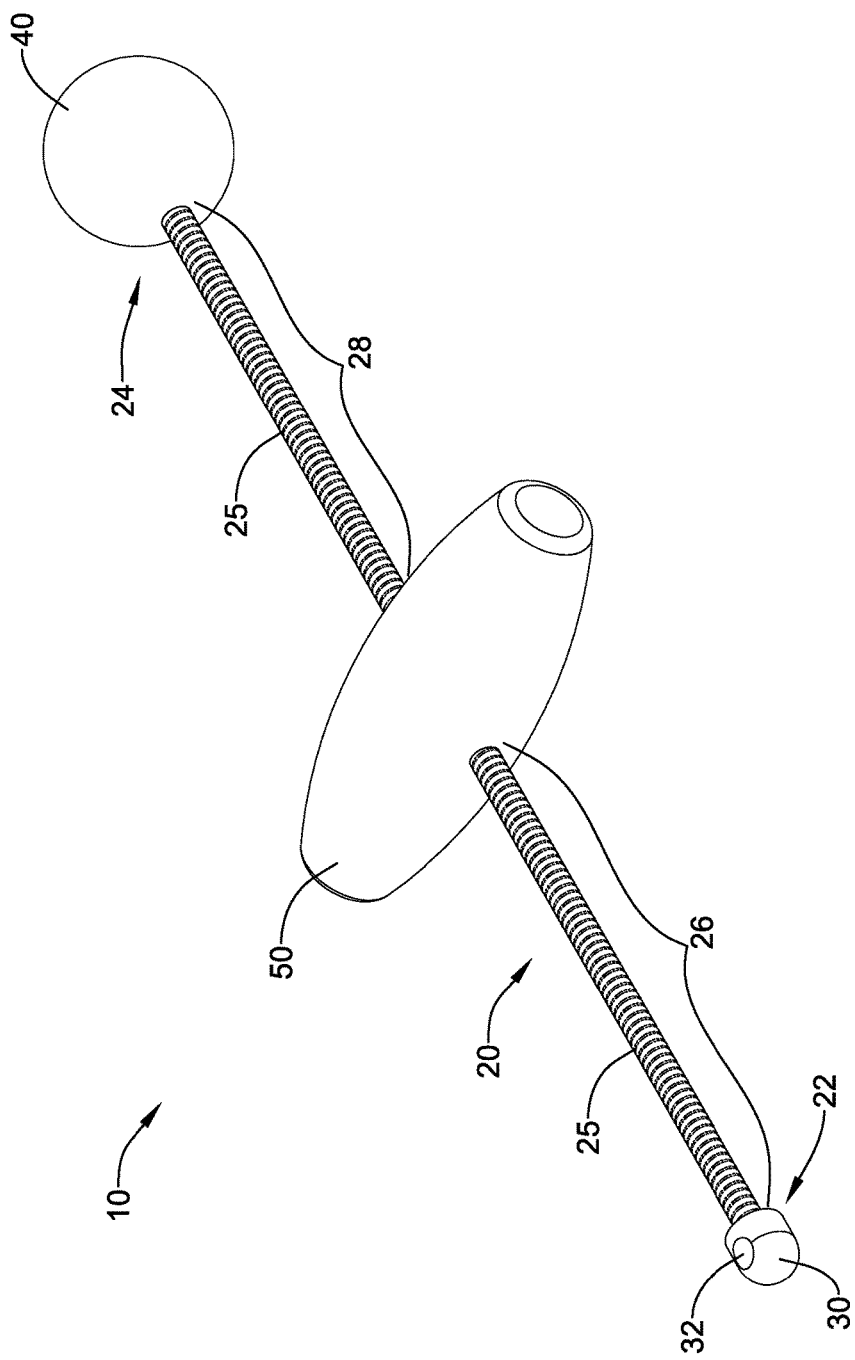
FIG. 1 is a perspective view of an example bobber.

While the invention is amenable to various modifications and alternative forms, specifics thereof have been shown by way of example in the drawings and will be described in greater detail below. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The following description should be read with reference to the drawings, which are not necessarily to scale, wherein like reference numerals indicate like elements throughout the several views. The detailed description and drawings are intended to illustrate but not limit the claimed invention. Those skilled in the art will recognize that the various elements described and/or shown may be arranged in various combinations and configurations without departing from the scope of the disclosure. The detailed description and drawings illustrate example embodiments of the claimed invention.

For the following defined terms, these definitions shall be applied, unless a different definition is given in the claims or elsewhere in this specification.

All numeric values are herein assumed to be modified by the term "about," whether or not explicitly indicated. The term "about", in the context of numeric values, generally refers to a range of numbers that one of skill in the art would consider equivalent to the recited value (i.e., having the same function or result). In many instances, the term "about" may include numbers that are rounded to the nearest significant figure. Other uses of the term "about" (i.e., in a context other than numeric values) may be assumed to have their ordinary and customary definition(s), as understood from and consistent with the context of the specification, unless otherwise specified.

Weight percent, percent by weight, wt %, wt-%, % by weight, and the like are synonyms that refer to the concentration of a substance as the weight of that substance divided by the weight of the composition and multiplied by 100.

The recitation of numerical ranges by endpoints includes all numbers within that range, including the endpoints (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of one skilled in the art to effect such feature, structure, or characteristic in connection with other embodiments, whether or not explicitly described, unless clearly stated to the contrary. That is, the various individual elements described below, even if not explicitly shown in a particular combination, are nevertheless contemplated as being combinable or arrangable with each other to form other additional embodiments or to complement and/or enrich the described embodiment(s), as would be understood by one of ordinary skill in the art.

FIG. 1 schematically illustrates an example fishing bobber 10. The fishing bobber 10 may include an elongate shaft 20 having a first end 22, an opposing second end 24, and a longitudinal axis extending therebetween. In some embodiments, the elongate shaft 20 may be a solid rod, a tubular body, or a combination thereof. In some embodiments, the elongate shaft 20 may have an outer profile or shape that is round, square, elliptical, polygonal, or other suitable shape(s), as desired. The fishing bobber 10 may include a line retainer 30 disposed at or adjacent to the first end 22. In some embodiments, the line retainer 30 may include an aperture 32 extending therethrough for retaining a fishing line passing through the aperture 32. In some embodiments, the line retainer 30 may include a slot, a notch, a hook, a latch, or other suitable line retaining means in place of, or in addition to, the aperture 32. For clarity, only the aperture 32 is illustrated and discussed in this application. However, the skilled artisan will recognize that other suitable line retaining means are contemplated and included within the scope of the present disclosure.

The fishing bobber 10 may include a counterweight float 40 disposed at or adjacent to the second end 24 of the elongate shaft 20. In some embodiments, the counterweight float 40 may be fixedly attached to the elongate shaft 20. In some of these embodiments, the counterweight float 40 may be fixedly attached to the elongate shaft 20 by adhesive bonding, welding, mechanical fastener(s), friction fit, interference fit, or other suitable means. In some embodiments, the counterweight float 40 may be axially movable along the elongate shaft 20. In some of these embodiments, the counterweight float 40 may be fixed in position along the elongate shaft 20 by friction fit, interference fit, and/or mechanical fasteners such as nuts, clips, springs, pins, etc., or other suitable means. In some embodiments, the counterweight float 40 may be buoyant in water. For example, in some embodiments, the counterweight float 40 may be made from a buoyant material having a density less than that of water and/or a specific gravity less than 1.0. In some embodiments, the counterweight float 40 may derive buoyancy from displacement of water due to the counterweight float having a hollow interior and/or a large surface area. In some embodiments, the counterweight float 40 may include a permanent or removable secondary weight element. In embodiments having a secondary weight element, the counterweight float 40 may be sufficiently buoyant to prevent the secondary weight element from causing the counterweight float 40 to sink in water.

Figure 2:
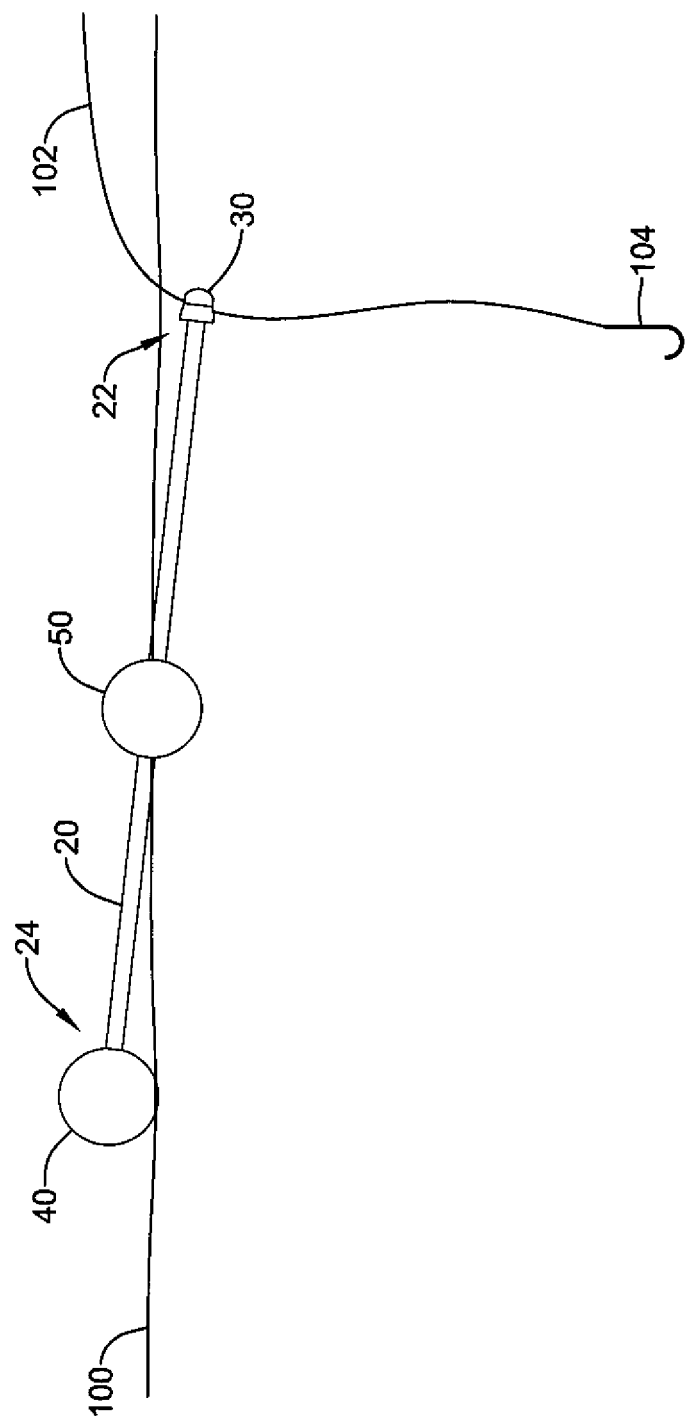
FIG. 2 illustrates an example bobber in use on the water surface.

The fishing bobber 10 may include a primary or pivot float 50 disposed on or along the elongate shaft 20 between the first end 22 and the second end 24. In some embodiments, the primary float 50 may be an oblong or ovoid shape having a major axis that is perpendicular to the elongate shaft 20. In some embodiments, the primary float 50 may have another suitable shape such as, but not limited to, round, spherical, polygonal, etc. Similar to the counterweight float 40 above, in some embodiments, the primary float 50 may be buoyant in water. For example, in some embodiments, the primary float 50 may be made from a buoyant material having a density less than that of water and/or a specific gravity less than 1.0. In some embodiments, the primary float 50 may derive buoyancy from displacement of water due to the primary float having a hollow interior and/or a large surface area. In some embodiments, the primary float 50 may define a pivot axis extending therethrough perpendicular to the longitudinal axis of the elongate shaft 20. In some embodiments, the pivot axis may be coaxial and/or coincident with the major axis of the primary float 50. In some embodiments, the elongate shaft 20 may be configured to rotate about the pivot axis between a generally horizontal position, as seen for example in FIG. 2, and a generally vertical position, as seen for example in FIG. 3, in response to a force applied at the first end 22. In general, it may be desirable for the shape of the primary float 50 to include a sufficiently rounded outer surface to facilitate approximately 90 degrees of rotation about the pivot axis. Comparatively, a relatively flat or disc-shaped primary float would be less likely to smoothly rotate about the pivot axis in water and is therefore less desirable.

Figure 3:
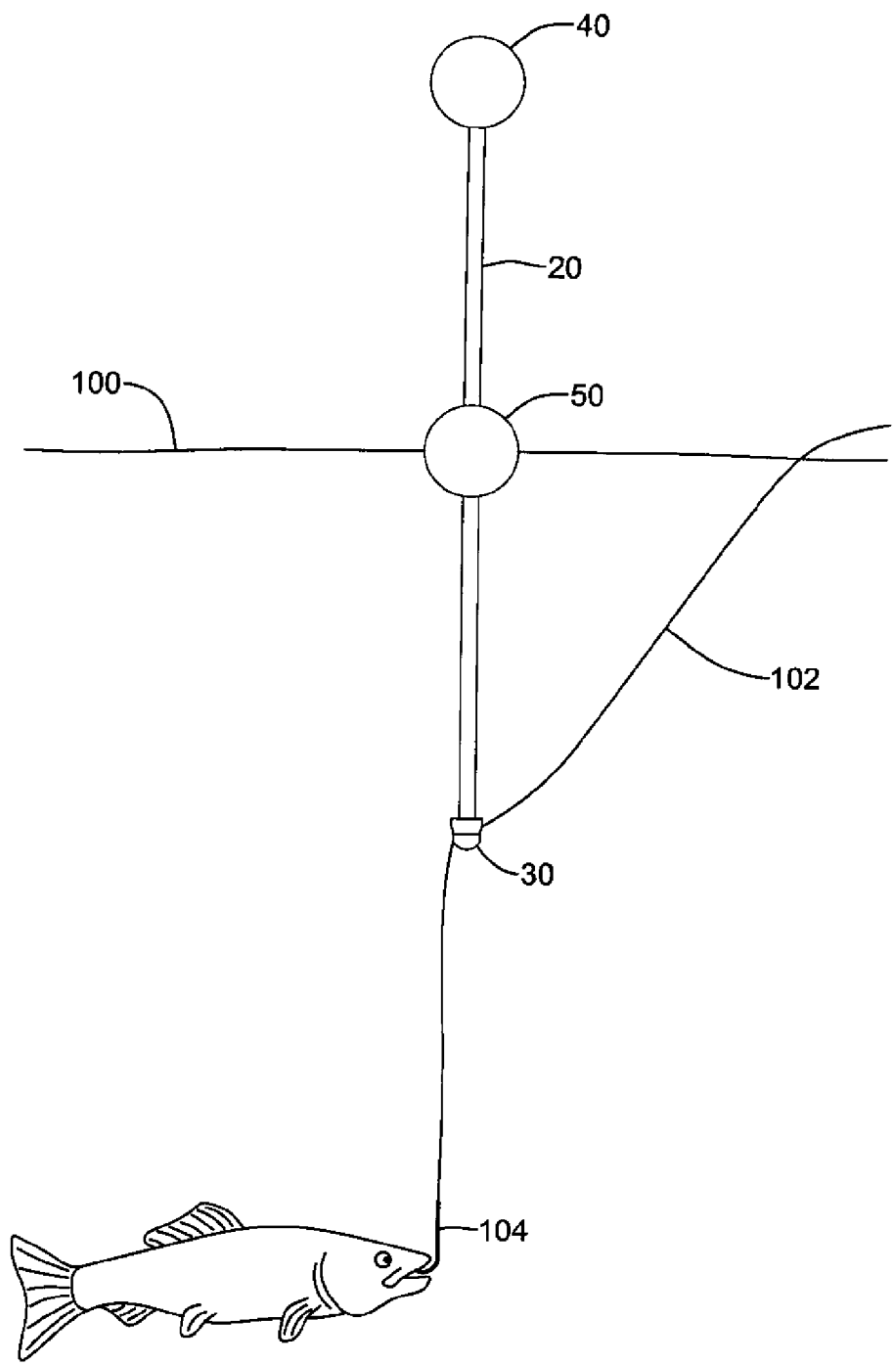
FIG. 3 illustrates an example bobber in use on the water surface.

In use on a surface 100 of water, the first end 22 of the elongate shaft 20 may rest at or just below the surface 100 in the generally horizontal position when the fishing bobber 10 is properly balanced. Balancing of the fishing bobber 10 will be explained in more detail below. A fishing line 102 having a hook or lure 104 disposed thereon, for example at a distal end of the fishing line 102, may be disposed within and/or pass through the line retainer 30, such as within the aperture 32. In some embodiments, the fishing line 102 may include a sinker and/or secondary weight disposed thereon. In embodiments where the fishing bobber 10 is used as a fixed-position bobber, the fishing line 102 is fixedly attached to the fishing bobber 10 at the line retainer 30—typically by tying the fishing line 102 to the line retainer 30 or by use of a retaining mechanism such as a spring. When used as a fixed-position bobber, the length of fishing line 102 distal of the line retainer 30 (relative to the angler) to the hook or lure 104 remains constant. In embodiments where the fishing bobber 10 is used as a slip bobber, the fishing line 102 proximal of the hook or lure 104 may pass freely through the line retainer 30 until a stopper, which is fixed in position along the fishing line 102, contacts the line retainer. In some cases, the stopper may be a knot tied onto the fishing line 102 and a bead or other element disposed distal of the knot (relative to the angler) and proximal of the line retainer 30. The bead or other element is typically of sufficient size that it cannot pass through or past the line retainer 30. The general mechanics of fixed-position and slip bobber arrangements are known in the art and therefore will not be explained in greater detail herein. During use, when a fish bites or strikes the hook or lure 104, as seen in FIG. 3, the fish will typically pull the hook or lure 104 downward. Thus, a tensile force applied at the hook or lure 104 may transfer into a downward force applied at the first end 22 and/or the line retainer 30, which may cause the elongate shaft 20 to rotate about the pivot axis of the primary float 50 toward or to the generally vertical position, as shown in FIG. 3. Accordingly, the second end 24 and/or the counterweight float 40 rotates upward and/or rises from the surface 100 of the water, thereby indicating a strike on the hook or lure 104 by a fish. Further examples of the elongate shaft 20 rotating about the pivot axis and/or translating from the generally horizontal position to the generally vertical position may be seen in FIGS. 4-8A.

Figure 4:
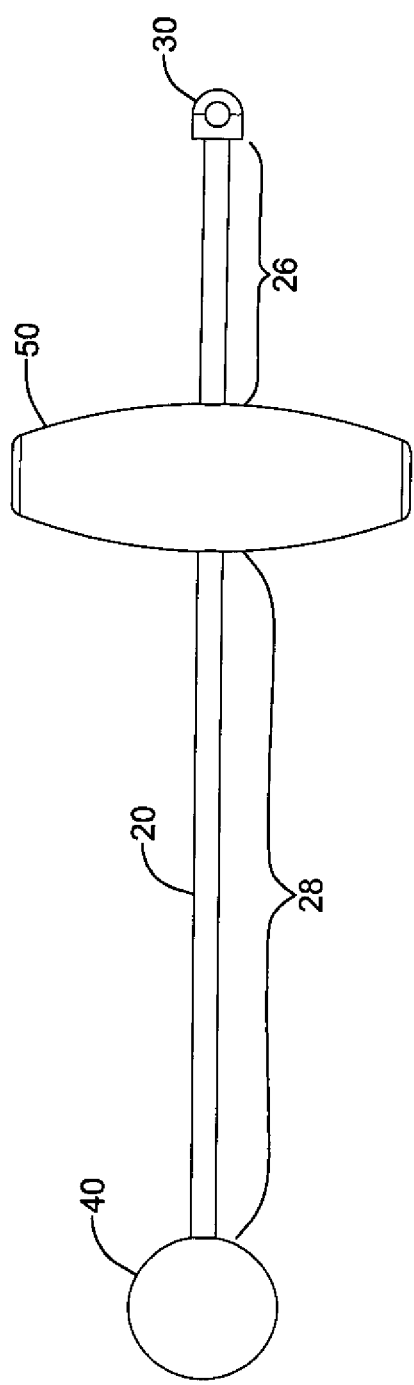
FIG. 4 illustrates an example bobber configuration.
Figure 4A:
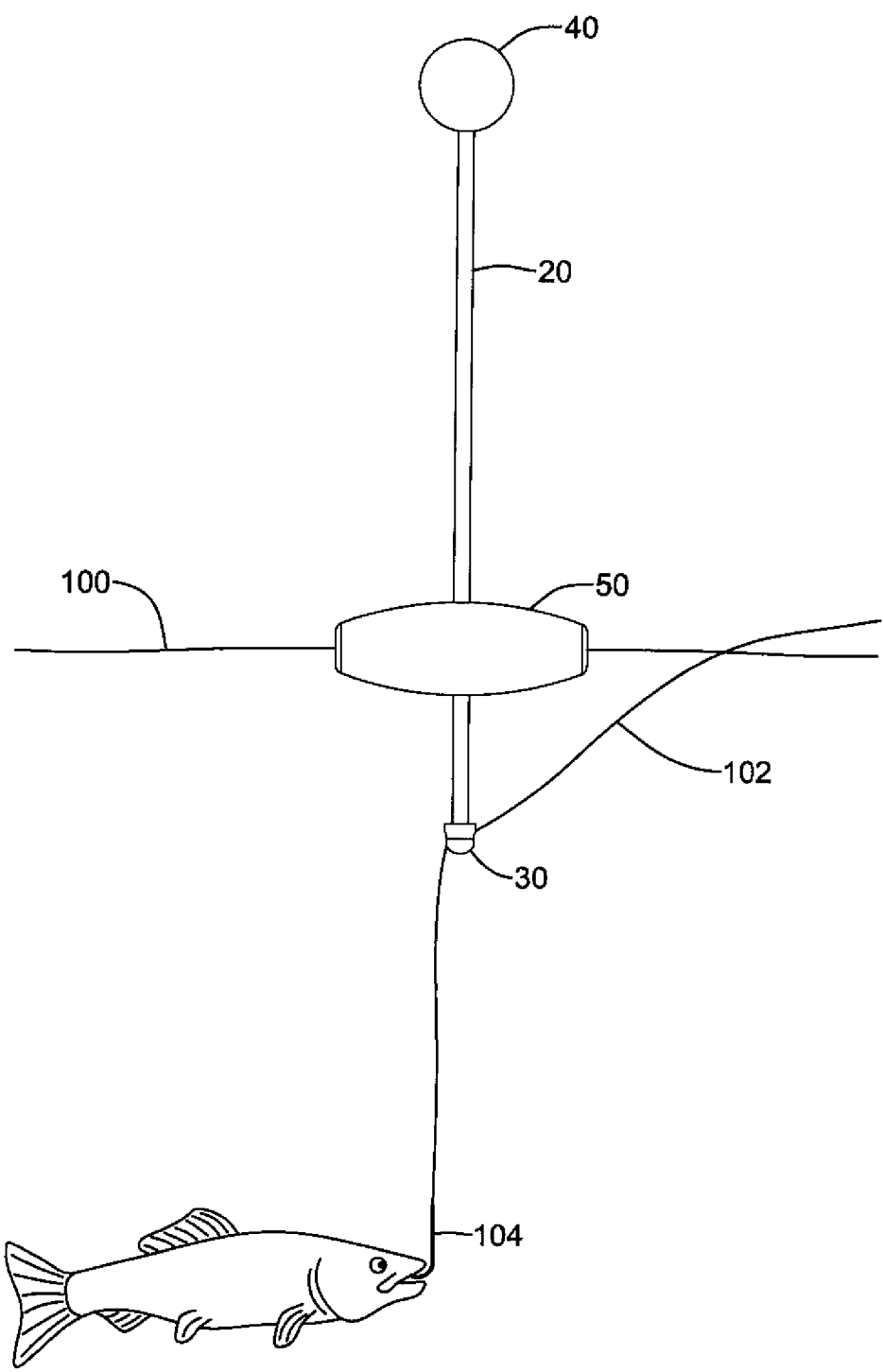
FIG. 4A illustrates the example bobber configuration of FIG. 4 in use on the water surface.
Figure 5:
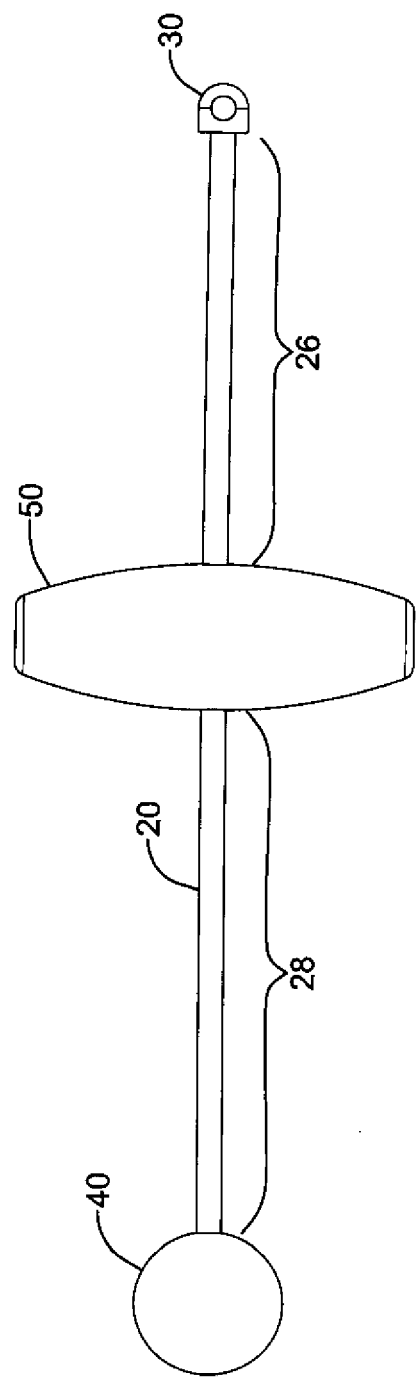
FIG. 5 illustrates an example bobber configuration.
Figure 5A:
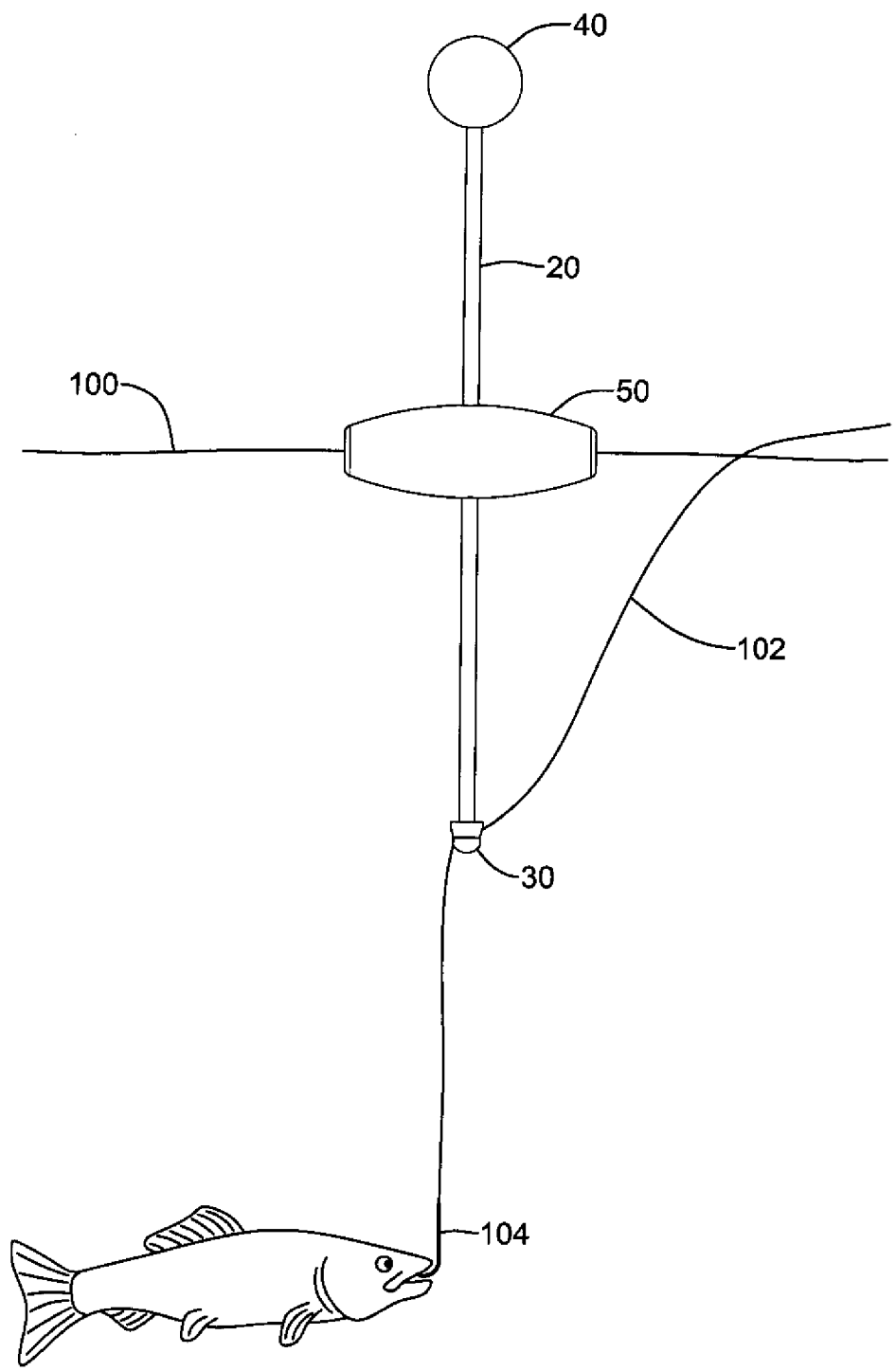
FIG. 5A illustrates the example bobber configuration of FIG. 5 in use on the water surface.
Figure 6:
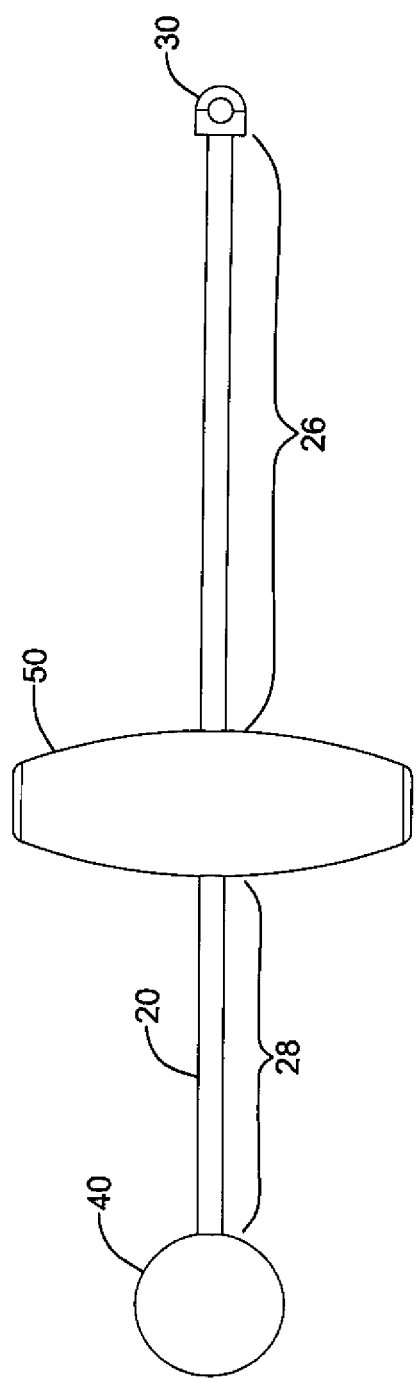
FIG. 6 illustrates an example bobber configuration.
Figure 6A:
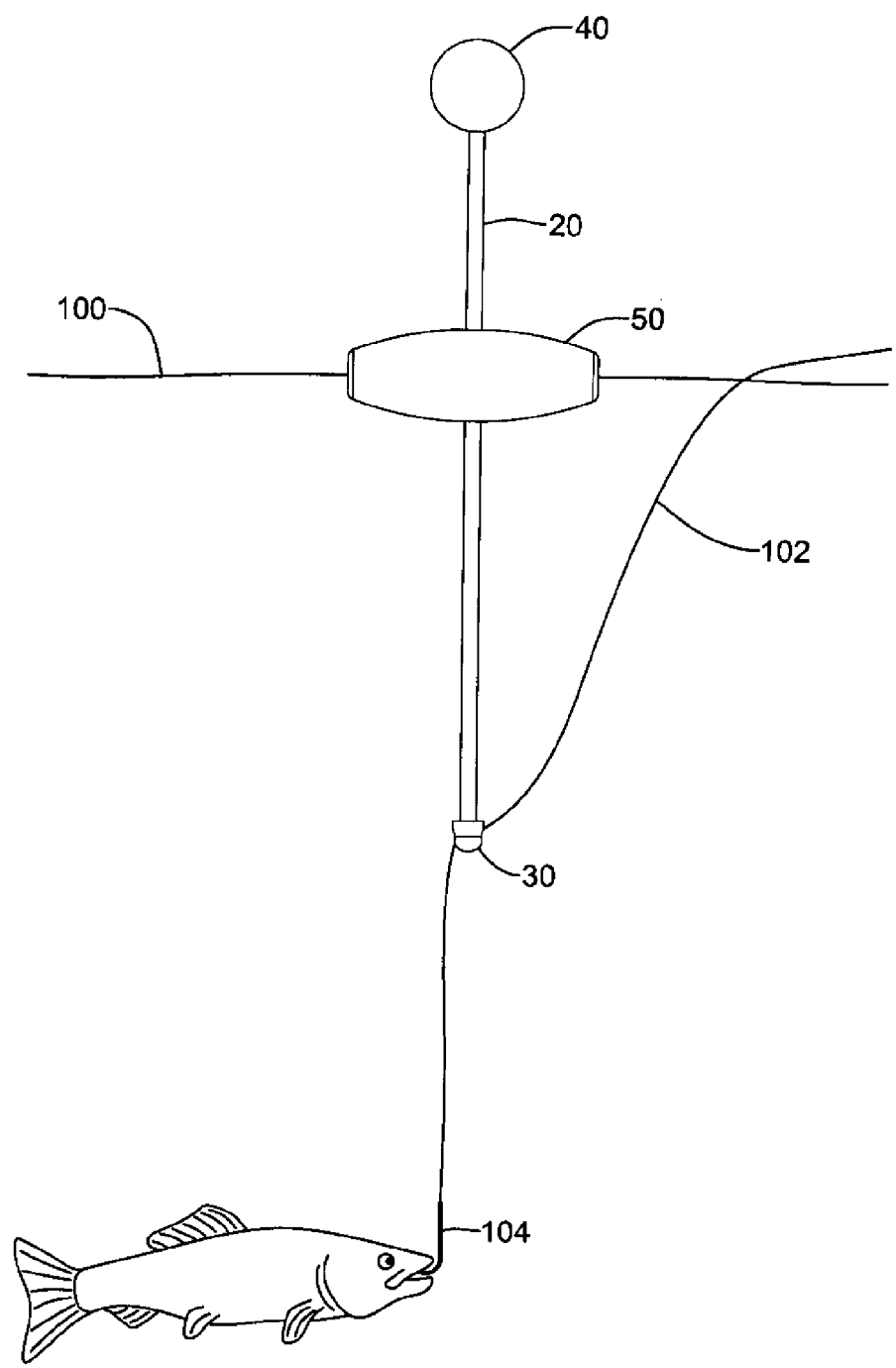
FIG. 6A illustrates the example bobber configuration of FIG. 6 in use on the water surface.
Figure 7A:
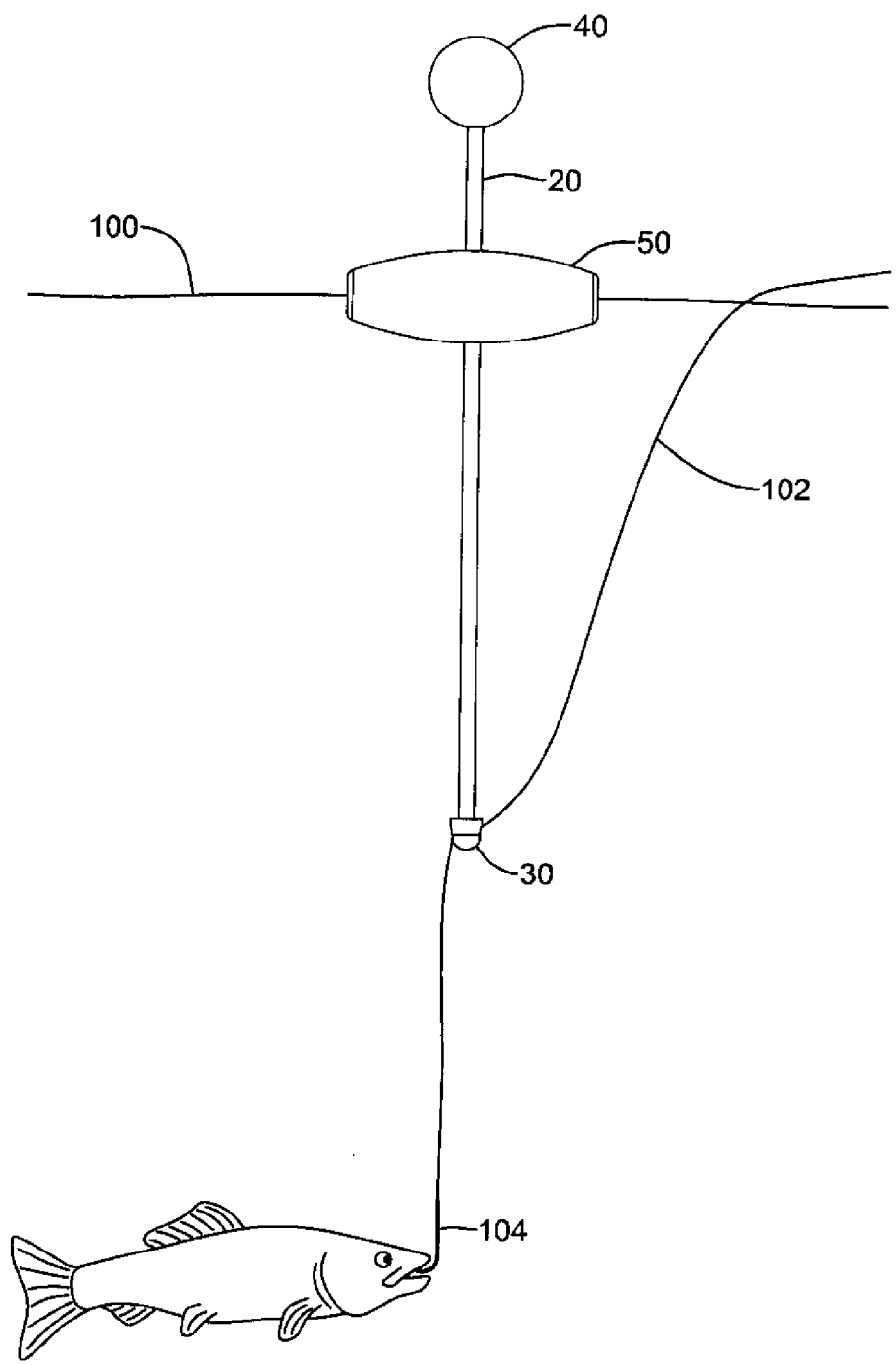
FIG. 7A illustrates the example bobber configuration of FIG. 7 in use on the water surface.
Figure 8:
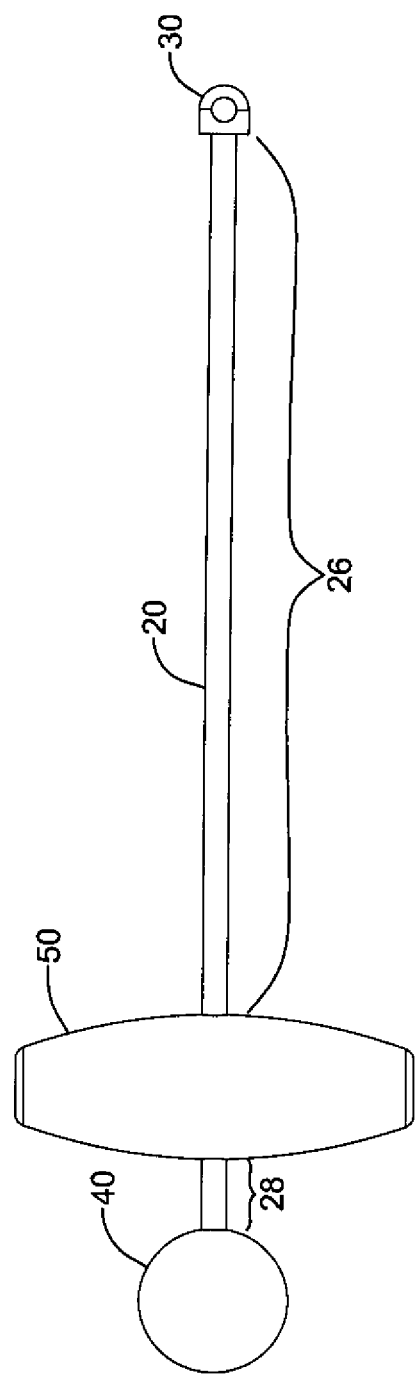
FIG. 8 illustrates an example bobber configuration.
Figure 8A:
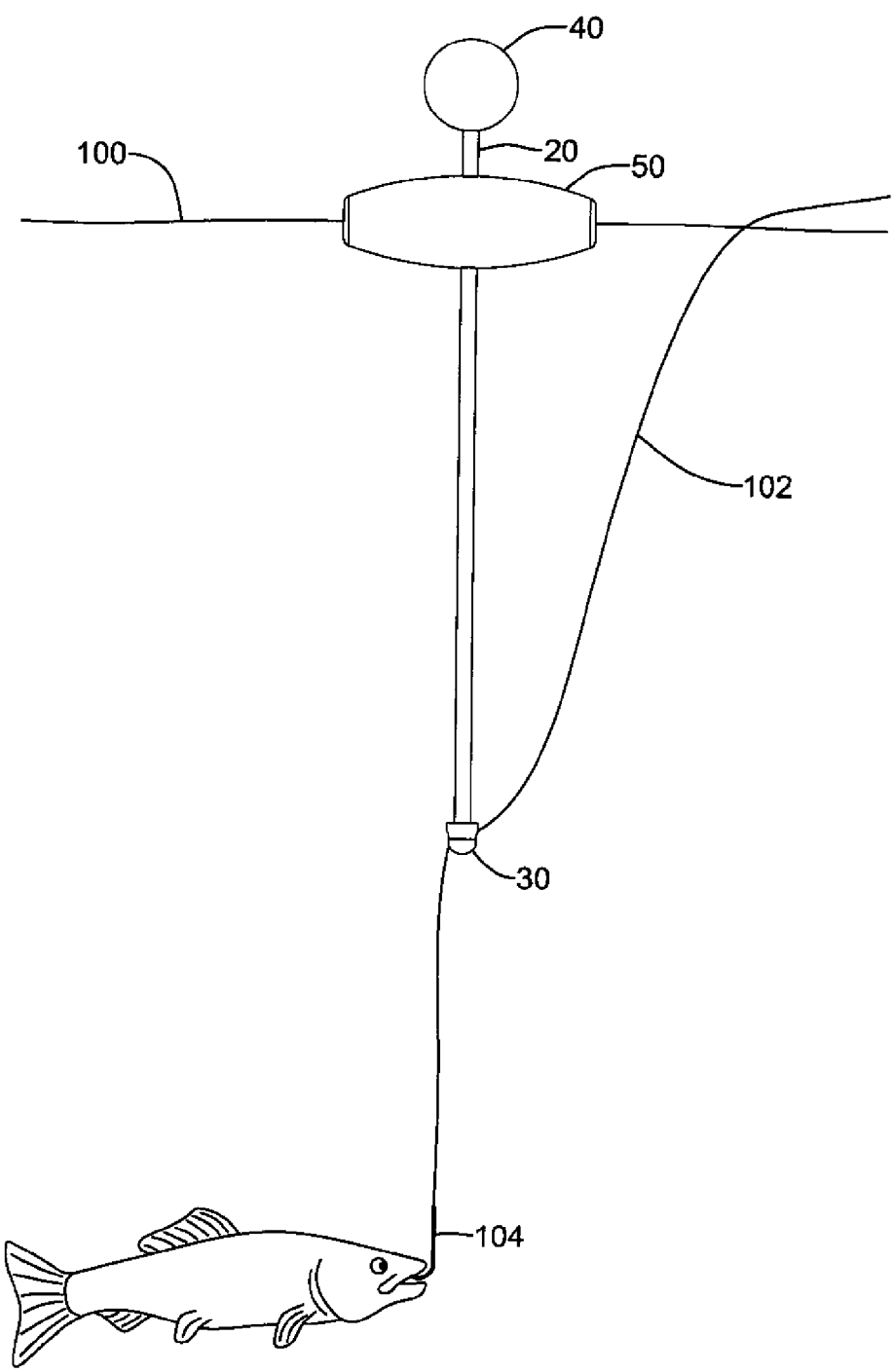
FIG. 8A illustrates the example bobber configuration of FIG. 8 in use on the water surface.

In some embodiments, the primary float 50 and/or the pivot axis may be axially movable along the elongate shaft 20. The primary float 50 may define a first portion 26 and a second portion 28 of the elongate shaft 20. The first portion 26 may be defined as being between the first end 22 and the primary float 50. The second portion 28 may be defined as being between the second end 24 and the primary float 50. In some embodiments, the first portion 26 may be longer than the second portion 28, as seen for example in FIGS. 6-8A. In some embodiments, the first portion 26 may be shorter than the second portion 28, as seen for example in FIGS. 4 and 4A. In some embodiments, the first portion 26 and the second portion 28 may be substantially the same length, as seen for example in FIGS. 5 and 5A. The skilled artisan will recognize that axially moving the primary float 50 along the elongate shaft 20 may change the lengths of the first portion 26 and the second portion 28. FIGS. 4-8A illustrate examples of the adjustability of the primary float 50 along the length of the elongate shaft 20. Any one embodiment may be capable of being positioned in and/or being adjusted to each of the configurations shown in FIGS. 4-8A.

In some embodiments, the primary float 50 may be slidably disposed on the elongate shaft 20. In some embodiments, the elongate shaft 20 may be tubular, may have a lumen extending therethrough, and/or may include a tubular portion and/or a lumen disposed therein. In some embodiments, the primary float 50 may be rotatably disposed on the elongate shaft 20. In some embodiments, the elongate shaft 20 may include external threads 25 (shown in FIG. 1 in phantom), and/or may be a threaded rod, configured to engage internal threads disposed within the primary float 50. In some embodiments, the primary float 50 may be adjustably fixed in position along the elongate shaft 20 by friction fit, interference fit, and/or mechanical fasteners such as nuts, clips, springs, pins, etc., or other suitable means.

In some embodiments, the fishing bobber 10 includes and/or defines a center of mass. In some embodiments, when the fishing bobber 10 is properly balanced, the pivot axis of the primary float 50 may be found at the center of mass. When properly balanced, the fishing bobber 10, suspended at the pivot axis or center of mass, will rest in the generally horizontal position. The fishing bobber 10 is most sensitive to a strike or force applied at the hook or lure 104 and/or the first end 22 of the elongate shaft 20 when properly balanced. As such, a very small input of force is required to upset the center of mass, which may be indicated by the elongate shaft 20 "tipping up" or rotating about the pivot axis toward the generally vertical position.

In order to balance the fishing bobber 10, the primary float 50 may be axially adjusted along the elongate shaft 20 in order to align the pivot axis with the center of mass. The elongate shaft 20 operates as a leverage arm. As more weight is added at or adjacent to the first end 22, such as by using and/or adding a heavier hook or lure 104, sinker or secondary weight, and/or bait, the elongate shaft acts as a lever about the pivot axis. The weight at or adjacent to the first end 22 can be balanced in one of two ways, or a combination thereof. First, weight can be added at the second end 24 to offset the weight at the first end 22. This may be accomplished by adding weight to an adjustable counterweight float 40, or by using a larger or heavier non-adjustable counterweight float 40. Secondly, the primary float 50 (and therefore the pivot axis) may be moved along the elongate shaft 20 toward the center of mass. In some embodiments, axially moving the primary float 50 along the elongate shaft 20 shifts the pivot axis toward the center of mass of the fishing bobber 10 along the longitudinal axis of the elongate shaft 20. As the center of mass approaches the second end 24 and/or the counterweight float 40, the sensitivity of the fishing bobber 10 increases—less force is required at the first end 22 to cause the elongate shaft 20 to pivot about the pivot axis, when the pivot axis is located at the center of mass. In other words, the longer the first portion 26 of the elongate shaft 20 is, the more leverage the first end 22 has, and the less force is required to rotate the elongate shaft 20 about the pivot axis.

In use, as the hook or lure 104, the sinker or secondary weight, and/or the bait is lowered into the water from above, its weight is reduced due to buoyancy, thereby permitting the first end 22 to pivot upward and the second end 24 and/or the counterweight float 40 to pivot downward toward the surface 100 of the water (i.e., the second end 24 "weighs" more than the first end 22 and thus moves downward under the force of gravity). This buoyancy may cause the center of mass to shift toward the second end 24 and/or the counterweight float 40 compared to when the entire system (i.e., fishing line 102, hook or lure 104, fishing bobber 10, optional bait, optional sinker or secondary weight, etc.) is outside of the water. In other words, a balanced system outside of the water would not be balanced when only a portion of that system is placed into the water.

When placed on the surface 100 of the water, the fishing bobber 10 assumes the generally horizontal position when balanced. If the fishing bobber 10 is out of balance, the primary float 50 may be moved along the elongate shaft 20 to thereby shift the primary float 50 and/or the pivot axis toward the center of mass. If when placed on the surface 100 of the water, the first end 22 sinks and the counterweight float 40 pivots upward, but the primary float 50 does not sink, the fishing bobber 10 is not balanced—the center of mass is improperly located. As such, the primary float 50 may be moved closer to the first end 22 and/or weight may be added to the second end 24 in order to move the primary float 50 and/or the pivot axis toward the center of mass and achieve balance. Less weight at the second end 24 is generally preferred for the greatest sensitivity. However, since the counterweight float 40 is also buoyant, a predetermined amount of weight may be added to an adjustable counterweight float 40, or a larger, heavier counterweight float 40 may be used without the second end 24 sinking.

If when placed on the surface 100 of the water, the fishing bobber 10 comes to rest in the generally horizontal position, but the elongate shaft 20 does not pivot about the pivot axis at a sufficiently low enough force applied at the first end 22 to indicate a very light strike by a fish, the fishing bobber 10 is not balanced—the center of mass is improperly located. As such, the primary float 50 may be moved closer to the second end 24 and/or weight may be removed from the second end 24 in order to increase leverage at the first end 22, move the center of mass, move the pivot axis toward the center of mass, and/or achieve balance. In general, moving the center of mass closer to the second end 24 and/or moving the primary float 50 toward the center of mass increases the sensitivity of the fishing bobber 10 to force applied at the first end 22. Conversely, moving the center of mass closer to the first end 22 and/or moving the primary float away from the center of mass reduces the sensitivity of the fishing bobber 10 to force applied at the first end 22 (i.e., a bite or strike).

As mentioned above, FIGS. 4-8A illustrate examples of the adjustability of the primary float 50 along the elongate shaft 20. If all other aspects are the same (i.e., weight/size of lure, sinker or secondary weight, bait, buoyancy of floats, etc.), and the floats are sufficiently buoyant to support the total mass of the system, the arrangement shown in FIGS. 4 and 4A would be the least sensitive, and the arrangement shown in FIGS. 8 and 8A would be the most sensitive, with the arrangements shown in FIGS. 5-7A having varying degrees of sensitivity therebetween. As mentioned above, the primary float 50 may be adjusted along the length of the elongate shaft 20, and each of the arrangements referenced above may be achieved by a single device and/or embodiment.

If when placed on the surface 100 of the water, the first end 22 sinks and the counterweight float 40 pivots upward, but the primary float 50 also sinks, the hook or lure 104 (along with any added bait and/or sinker or secondary weight) is too heavy for the primary float 50 to support. In such an instance, a larger primary float 50 may be used, a smaller or lighter hook or lure 104 (and/or bait, or sinker or secondary weight) may be used, or a combination thereof, until the primary float 50 supports the total weight attached at or adjacent to the first end 22. Once a sufficiently sized primary float 50 has been obtained, sensitivity of the fishing bobber 10 may be adjusted as described above.

Once balance has been achieved, and the fishing bobber 10 rests in the generally horizontal position when disposed in the water, the fishing bobber 10 serves to indicate a strike by a fish at the hook or lure 104. When using a conventional bobber, the buoyancy of the conventional bobber must be overcome by the fish in order to indicate a bite. That is, the fish must pull the conventional bobber under the surface of the water. In many instances, a very light bite will not exert sufficient force to overcome the buoyancy of the conventional bobber and/or the fish may release the hook or lure. With the fishing bobber 10 of the instant disclosure, the leverage provided by the elongate shaft 20 permits a very low amount of force applied at the first end 22 to cause the elongate shaft 20 to pivot about the pivot axis and indicate a strike or bite. Since the primary float 50 does not need to be submerged below the surface 100 of the water to indicate a strike, the buoyancy of the fishing bobber 10 has been removed as an indication of a strike or bite. A fish biting at the hook or lure 104 may pull the hook or lure 104 downward by the length of the first portion 26 of the elongate shaft 20 as the elongate shaft 20 pivots about the pivot axis before buoyancy becomes a factor or provides resistance to the fish. As such, the fish feels very little or no tension on the fishing line 102 as the elongate shaft 20 pivots. Once the "slack" provided by the elongate shaft 20 has been taken up by the fish as it "runs with the bait", additional tensile force applied by the fish may pull the primary float 50 under the surface 100 of the water, as happens with a conventional bobber. In other words, the elongate shaft 20, the counterweight float 40, and the primary float 50 cooperate to substantially eliminate buoyancy in indicating a strike on the fishing line 102 engaged with the line retainer 30.

When resting in the generally horizontal position, the first end 22 of the elongate shaft 20 lies at or just below the surface 100 of the water. In some embodiments, the first end 22 may be disposed slightly below or lower than the second end 24, relative to the surface 100 of the water. Buoyancy provided to the first end 22 and/or the hook or lure 104 (and any bait and/or sinker or secondary weight thereon) by the water shifts the center of mass toward the second end 24 and increases leverage at the first end 22. Accordingly, having the first end 22 disposed at or below a horizontal plane passing through the pivot axis is desired. Such an arrangement may be achieved by adjusting the center of mass and/or the location of the pivot axis. Additionally, in some embodiments, the primary float 50 may have a first maximum radial extent measured from the elongate shaft 20 in a direction normal to the surface 100 of the water, and the counterweight float 40 may have a second maximum radial extent measured from the elongate shaft 20 in a direction normal to the surface 100 of the water, where the second maximum radial extent may be greater than the first maximum radial extent. In other words, when resting at the surface 100 of the water in the generally horizontal position, the "center" of the counterweight float 40 and/or the second end 24 may be positioned an equal or greater distance above the surface 100 than the pivot axis, with the elongate shaft angled downward from the second end 24 toward the first end 22 relative to the surface 100 of the water.

Figure 11:
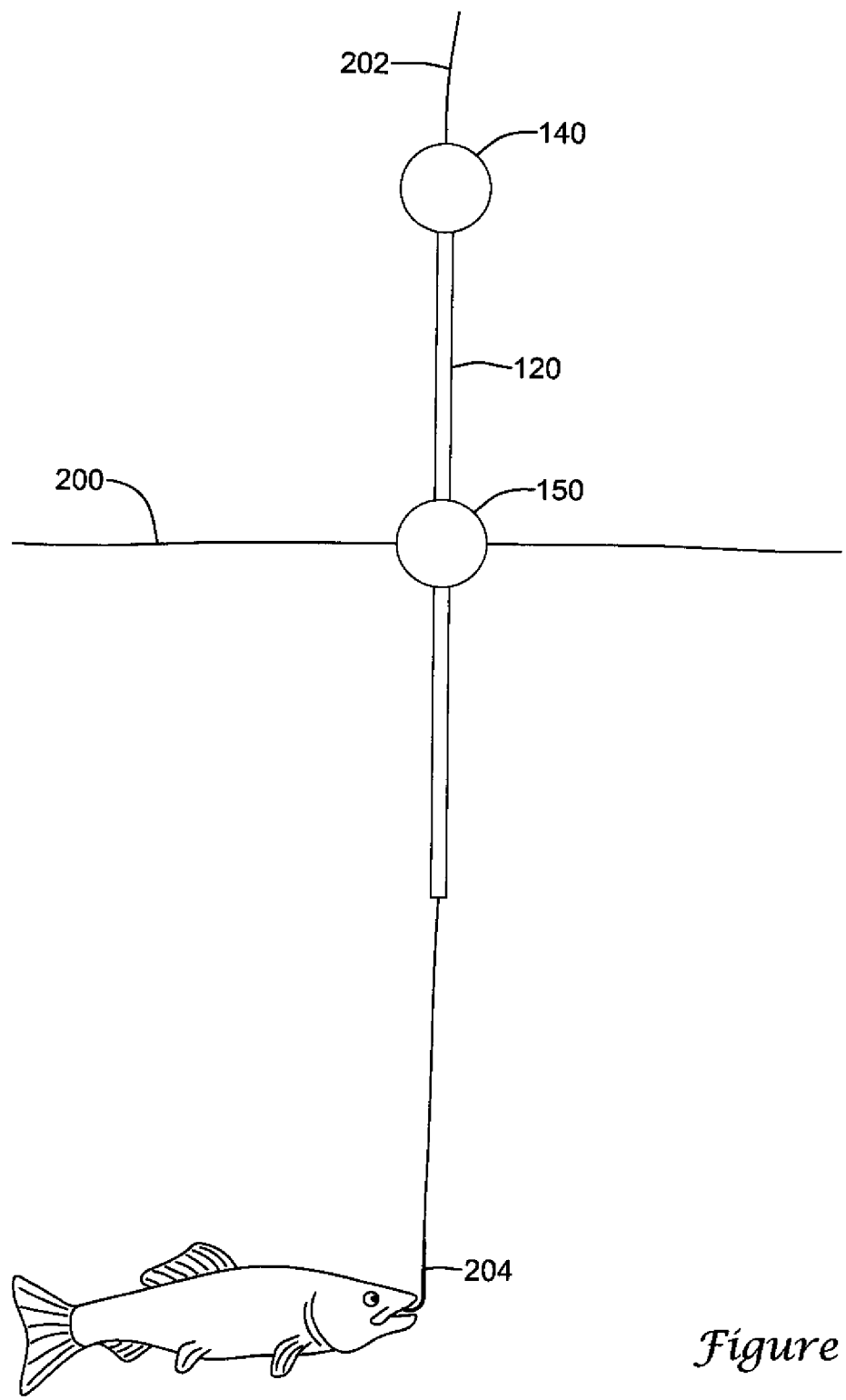
FIG. 11 illustrates an example bobber in use on the water surface.

In an alternative embodiment, as seen for example in FIGS. 9-11, a fishing bobber 110 may include an elongate shaft 120 having a first end 122, an opposing second end 124, and a lumen 118 extending therethrough along a longitudinal axis. The fishing bobber 110 may include a counterweight float 140 disposed at or adjacent to the second end 124. In some embodiments, the lumen 118 may pass through or extend past the counterweight float 140. In some embodiments, the counterweight float 140 may be fixedly attached to the elongate shaft 120 by adhesive bonding, welding, mechanical fastener(s), friction fit, interference fit, or other suitable means. In some embodiments, the counterweight float 140 may be axially movable along the elongate shaft 120. In some of these embodiments, the counterweight float 140 may be fixed in position along the elongate shaft 120 by friction fit, interference fit, and/or mechanical fasteners such as nuts, clips, springs, pins, etc. or other suitable means. In some embodiments, the counterweight float 140 may be buoyant in water. For example, in some embodiments, the counterweight float 140 may be made from a buoyant material having a density less than that of water and/or a specific gravity less than 1.0. In some embodiments, the counterweight float 140 may derive buoyancy from displacement of water due to the counterweight float having a hollow interior and/or a large surface area. In some embodiments, the counterweight float 140 may include a permanent or removable secondary weight element. In embodiments having a secondary weight element, the counterweight float 140 may be sufficiently buoyant to prevent the secondary weight element from causing the counterweight float 140 to sink in water.

The fishing bobber 110 may include a primary or pivot float 150 disposed on or along the elongate shaft 120 between the first end 122 and the second end 124. In some embodiments, the primary float 150 may be an oblong or ovoid shape having a major axis that is perpendicular to the elongate shaft 120. In some embodiments, the primary float 150 may have another suitable shape such as, but not limited to, round, spherical, polygonal, etc. Similar to the counterweight float 140 above, in some embodiments, the primary float 150 may be buoyant in water. For example, in some embodiments, the primary float 150 may be made from a buoyant material having a density less than that of water and/or a specific gravity less than 1.0. In some embodiments, the primary float 150 may derive buoyancy from displacement of water due to the counterweight float having a hollow interior and/or a large surface area. In some embodiments, the primary float 150 may define a pivot axis extending therethrough perpendicular to the longitudinal axis of the elongate shaft 120. In some embodiments, the pivot axis may be coaxial and/or coincident with the major axis of the primary float 150. In some embodiments, the elongate shaft 120 may be configured to rotate about the pivot axis between a generally horizontal position, as seen for example in FIG. 10, and a generally vertical position, as seen for example in FIG. 11, in response to a force applied at the first end 122. In general, it may be desirable for the shape of the primary float 150 to include a sufficiently rounded outer surface to facilitate approximately 90 degrees of rotation about the pivot axis. Comparatively, a relatively flat or disc-shaped primary float would be less likely to smoothly rotate about the pivot axis in water and is therefore less desirable.

In use on a surface 200 of water, the first end 122 of the elongate shaft 120 may rest at or just below the surface 200 in the generally horizontal position when the fishing bobber 110 is properly balanced. Balancing of the fishing bobber 110 will be explained in more detail below. A fishing line 202 having a hook or lure 204 disposed thereon, for example at a distal end of the fishing line 202, may be engaged with an aperture at the first end 122 and may be disposed within and/or pass through the lumen 118. In some embodiments, the aperture may provide access into the lumen 118. In some embodiments, the fishing line 202 may include a sinker and/or secondary weight disposed thereon.

In embodiments where the fishing bobber 110 is used as a fixed-position bobber, the fishing line 202 is fixedly attached to the fishing bobber 110—typically by tying the fishing line 202 to the fishing bobber 110 or by use of a retaining mechanism such as a spring. When used as a fixed-position bobber, the length of fishing line 202 distal of the first end 122 (relative to the angler) to the hook or lure 204 remains constant. In embodiments where the fishing bobber 110 is used as a slip bobber, the fishing line 202 proximal of the hook or lure 204 may pass freely through the elongate shaft 120 until a stopper, which is fixed in position along the fishing line 202, contacts the elongate shaft 120 and/or the counterweight float 140. In some cases, the stopper may be a knot tied onto the fishing line 202 and a bead or other element disposed distal of the knot (relative to the angler) and proximal of the elongate shaft 120 and/or the counterweight float 140. The bead or other element is typically of sufficient size that it cannot pass through or past the elongate shaft 120 and/or the counterweight float 140. The general mechanics of fixed-position and slip bobber arrangements are known in the art and therefore will not be explained in greater detail herein. During use, when a fish bites or strikes the hook or lure 204, as seen in FIG. 11, the fish will typically pull the hook or lure 204 downward. Thus, a tensile force applied at the hook or lure 204 may transfer into a downward force applied at the first end 122, which may cause the elongate shaft 120 to rotate about the pivot axis of the primary float 150 toward or to the generally vertical position, as shown in FIG. 11. Accordingly, the second end 124 and/or the counterweight float 140 rotates upward and/or rises from the surface 200 of the water, thereby indicating a strike on the hook or lure 204 by a fish. Other examples of the elongate shaft rotating about the pivot axis and/or translating from the generally horizontal position to the generally vertical position may be seen in FIGS. 4-8A.

In some embodiments, the primary float 150 and/or the pivot axis may be axially movable along the elongate shaft 120. The primary float 150 may define a first portion 126 and a second portion 128 of the elongate shaft 120. The first portion 126 may be defined as being between the first end 122 and the primary float 150. The second portion 128 may be defined as being between the second end 124 and the primary float 150. In some embodiments, the first portion 126 may be longer than the second portion 128. In some embodiments, the first portion 126 may be shorter than the second portion 128. In some embodiments, the first portion 126 and the second portion 128 may be substantially the same length. The skilled artisan will recognize that axially moving the primary float 150 along the elongate shaft 120 may change the lengths of the first portion 126 and the second portion 128. FIGS. 4-8A illustrate examples of the adjustability of the primary float 150 along the length of the elongate shaft 120. Any one embodiment may be capable of being positioned in and/or being adjusted to each of the configurations shown in FIGS. 4-8A.

In some embodiments, the primary float 150 may be slidably disposed on the elongate shaft 120. In some embodiments, the elongate shaft 120 may be tubular, may include a lumen extending therethrough, and/or may have a tubular portion and/or a lumen disposed therein. In some embodiments, the primary float 150 may be rotatably disposed on the elongate shaft 120. In some embodiments, the elongate shaft 120 may include external threads, and/or may be a threaded rod, configured to engage internal threads disposed within the primary float 150. In some embodiments, the primary float 150 may be adjustably fixed in position along the elongate shaft 120 by friction fit, interference fit, and/or mechanical fasteners such as nuts, clips, springs, pins, etc., or other suitable means.

In some embodiments, the fishing bobber 110 includes and/or defines a center of mass. In some embodiments, when the fishing bobber 110 is properly balanced, the pivot axis of the primary float 150 may be found at the center of mass. When properly balanced, the fishing bobber 110, suspended at the pivot axis or center of mass, will rest in the generally horizontal position, as seen for example in FIG. 10. The fishing bobber 110 is most sensitive to a strike or force applied at the hook or lure 204 and/or the first end 122 of the elongate shaft 120 when properly balanced. As such, a very small input of force is required to upset the center of mass, which may be indicated by the elongate shaft 120 "tipping up" or rotating about the pivot axis toward the generally vertical position, seen for example in FIG. 11.

In order to balance the fishing bobber 110, the primary float 150 may be axially adjusted along the elongate shaft 120 in order to align the pivot axis with the center of mass. The elongate shaft 120 operates as a leverage arm. As more weight is added at or adjacent to the first end 122, such as by using and/or adding a heavier hook or lure 104, sinker or secondary weight, and/or bait, the elongate shaft acts as a lever about the pivot axis. The weight at the first end 122 can be balanced in one of two ways, or a combination thereof. First, weight can be added at the second end 124 to offset the weight at or adjacent to the first end 122. This may be accomplished by adding weight to an adjustable counterweight float 140, or by using a larger or heavier non-adjustable counterweight float 140. Secondly, the primary float 150 (and therefore the pivot axis) may be moved along the elongate shaft 120 toward the center of mass. In some embodiments, axially moving the primary float 150 along the elongate shaft 120 shifts the pivot axis toward the center of mass of the fishing bobber 110 along the longitudinal axis of the elongate shaft 120. As the center of mass approaches the second end 124 and/or the counterweight float 140, the sensitivity of the fishing bobber 110 increases—less force is required at the first end 122 to cause the elongate shaft 120 to pivot about the pivot axis, when the pivot axis is located at the center of mass. In other words, the longer the first portion 126 of the elongate shaft 120 is, the more leverage the first end 122 has, and the less force is required to rotate the elongate shaft 120 about the pivot axis.

In use, as the hook or lure 204, sinker or secondary weight, and/or bait is lowered into the water from above, its weight is reduced due to buoyancy, thereby permitting the first end 122 to pivot upward and the second end 124 and/or the counterweight float 140 to pivot downward toward the surface 200 of the water (i.e., the second end 124 "weighs"

more than the first end 122 and thus moves downward under the force of gravity). This buoyancy may cause the center of mass to shift toward the second end 124 and/or the counterweight float 140 compared to when the entire system (i.e., fishing line 202, hook or lure 204, fishing bobber 110, optional bait, optional sinker or secondary weight, etc.) is outside of the water. In other words, a balanced system outside of the water would not be balanced when only a portion of that system is placed into the water.

When placed on the surface 200 of the water, the fishing bobber 110 assumes the generally horizontal position when balanced. If the fishing bobber 110 is out of balance, the primary float 150 may be moved along the elongate shaft 120 to thereby shift the primary float 150 and/or the pivot axis toward the center of mass. If when placed on the surface 200 of the water, the first end 122 sinks and the counterweight float 140 pivots upward, but the primary float 150 does not sink, the fishing bobber 110 is not balanced—the center of mass is improperly located. As such, the primary float 150 may be moved closer to the first end 122 and/or weight may be added to the second end 124 in order to move the primary float 150 and/or the pivot axis toward the center of mass and achieve balance. Less weight at the second end 124 is generally preferred for the greatest sensitivity. However, since the counterweight float 140 is also buoyant, a predetermined amount of weight may be added to an adjustable counterweight float 140, or a larger, heavier counterweight float 140 may be used without the second end 124 sinking.

If when placed on the surface 200 of the water, the fishing bobber 110 comes to rest in the generally horizontal position, but the elongate shaft 120 does not pivot about the pivot axis at a sufficiently low enough force applied at the first end 122 to indicate a very light strike by a fish, the fishing bobber 110 is not balanced—the center of mass is improperly located. As such, the primary float 150 may be moved closer to the second end 124 and/or weight may be removed from the second end 124 in order to increase leverage at the first end 122, move the center of mass, move the pivot axis toward the center of mass, and/or achieve balance. In general, moving the center of mass closer to the second end 124 and/or moving the primary float 150 toward the center of mass increases the sensitivity of the fishing bobber 110 to force applied at the first end 122. Conversely, moving the center of mass closer to the first end 122 and/or moving the primary float away from the center of mass reduces the sensitivity of the fishing bobber 110 to force applied at the first end 122 (i.e., a bite or strike).

As mentioned above, FIGS. 4-8A illustrate examples of the adjustability of the primary float 150 along the elongate shaft 120. If all other aspects are the same (i.e., weight/size of lure, sinker or secondary weight, bait, buoyancy of floats, etc.), and the floats are sufficiently buoyant to support the total mass of the system, the arrangement shown in FIGS. 4 and 4A would be the least sensitive, and the arrangement shown in FIGS. 8 and 8A would be the most sensitive, with the arrangements shown in FIGS. 5-7A having varying degrees of sensitivity therebetween. As mentioned above, the primary float 150 may be adjusted along the length of the elongate shaft 120, and each of the arrangements referenced above may be achieved by a single device and/or embodiment.

If when placed on the surface 200 of the water, the first end 122 sinks and the counterweight float 140 pivots upward, but the primary float 150 also sinks, the hook or lure 204 (along with any added bait and/or sinker or secondary weight) is too heavy for the primary float 150 to support. In such an instance, a larger primary float 150 may be used, a smaller or lighter hook or lure 204 (and/or bait, or sinker or secondary weight) may be used, or a combination thereof, until the primary float 150 supports the total weight attached at or adjacent to the first end 122. Once a sufficiently sized primary float 150 has been obtained, sensitivity of the fishing bobber 110 may be adjusted as described above.

Once balance has been achieved, and the fishing bobber 110 rests in the generally horizontal position when disposed in the water, the fishing bobber 110 serves to indicate a strike by a fish at the hook or lure 204. When using a conventional bobber, the buoyancy of the conventional bobber must be overcome by the fish in order to indicate a bite. That is, the fish must pull the conventional bobber under the surface of the water. In many instances, a very light bite will not exert sufficient force to overcome the buoyancy of the conventional bobber and/or the fish may release the hook or lure. With the fishing bobber 110 of the instant disclosure, the leverage provided by the elongate shaft 120 permits a very low amount of force applied at the first end 122 to cause the elongate shaft 120 to pivot about the pivot axis and indicate a strike or bite. Since the primary float 150 does not need to be submerged below the surface 200 of the water to indicate a strike, the buoyancy of the fishing bobber 110 has been removed as an indication of a strike or bite. A fish biting at the hook or lure 204 may pull the hook or lure 204 downward by the length of the first portion 126 of the elongate shaft 120 as the elongate shaft 120 pivots about the pivot axis before buoyancy becomes a factor or provides resistance to the fish. As such, the fish feels very little or no tension on the fishing line 202 as the elongate shaft 120 pivots. Once the "slack" provided by the elongate shaft 120 has been taken up by the fish as it "runs with the bait", additional tensile force applied by the fish may pull the primary float 150 under the surface 200 of the water, as happens with a conventional bobber. In other words, the elongate shaft 120, the counterweight float 140, and the primary float 150 cooperate to substantially eliminate buoyancy in indicating a strike on the fishing line 202 engaged with the elongate shaft 20.

When resting in the generally horizontal position, the first end 122 of the elongate shaft 120 lies at or just below the surface 200 of the water. In some embodiments, the first end 122 may be disposed slightly below or lower than the second end 124, relative to the surface 200 of the water. Buoyancy provided to the first end 122 and/or the hook or lure 204 (and any bait and/or sinker or secondary weight thereon) by the water shifts the center of mass toward the second end 124 and increases leverage at the first end 122. Accordingly, having the first end 122 disposed at or below a horizontal plane passing through the pivot axis is desired. Such an arrangement may be achieved by adjusting the center of mass and/or the location of the pivot axis. Additionally, in some embodiments, the primary float 150 may have a first maximum radial extent measured from the elongate shaft 120 in a direction normal to the surface 200 of the water, and the counterweight float 140 may have a second maximum radial extent measured from the elongate shaft 120 in a direction normal to the surface 200 of the water, where the second maximum radial extent may be greater than the first maximum radial extent. In other words, when resting at the surface 200 of the water in the generally horizontal position, the "center" of the counterweight float 140 and/or the second end 124 may be positioned an equal or greater distance above the surface 200 than the pivot axis, with the elongate shaft angled downward from the second end 124 toward the first end 122 relative to the surface 200 of the water.

In general, any suitable shape may be used for the primary float 50/150. Preference may be given toward using shapes that provide a high surface area contacting the surface 100/200 of the water, but this is not required. As discussed above, a rounded outer surface (or surface contacting the water) on the primary float 50/150 may facilitate rotation about the pivot axis. Similarly, any suitable shape may be used for the counterweight float 40/140. In general, shapes may be chosen which provide or enhance the desired positioning of the elongate shaft 20/120 in the horizontal position. However, some embodiments are contemplated where the first end 22/122 is positioned an equal or greater distance above the surface 100/200 of the water than the pivot axis.

With the "center of mass" adjustments described above, it is also possible to adjust the fishing bobber 10/110 such that the counterweight float 40/140 balances at an intermediate position between the generally horizontal position and the generally vertical position when at rest on the surface 100/200 of the water. The intermediate position may place the elongate shaft 20/120 at an angle relative to the surface 100/200 of the water of about 20 degrees, about 30 degrees, about 45 degrees, about 60 degrees, or another desired angle. Configuring the fishing bobber 10/110 in such a manner permits the fishing bobber 10/110 to indicate a fish bite or strike in both the upward and downward directions. Occasionally, a fish may be swimming upward within the water column when it strikes. If this happens, the counterweight float 40/140, which is positioned at a suspended location above the surface 100/200 of the water, may drop to the surface 100/200 of the water, thereby indicating a bite or strike. The weight and/or tension of the hook or lure 104/204 (and/or bait) maintains the fishing bobber 10/110 in balance at the intermediate position. If a fish takes the hook or lure 104/204 upward, the weight or tension on the fishing line 102/202 is reduced and the counterweight float 40/140 falls as the elongate shaft 20/120 pivots about the pivot axis. Similarly, since the fishing bobber 10/110 may still rotate upward to the generally vertical position from the intermediate position, a bite or strike in the downward direction can also be indicated from the intermediate position in the manner described above.

Various components of the fishing bobber 10/110 described herein may include or otherwise be made from suitable materials including but not limited to, wood, cork, balsa, foam, styrofoam, polymers, composites, metallic materials, or other suitable materials. As discussed above, some suitable materials may have a density less than water and/or a specific gravity relative to water of less than 1.0, or may be formed to include a gas trapped or entrained therein.

Various modifications and alterations of this invention will become apparent to those skilled in the art without departing from the scope and principles of this invention, and it should be understood that this invention is not to be unduly limited to the illustrative embodiments set forth hereinabove. All publications and patents are herein incorporated by reference to the same extent as if each individual publication or patent was specifically and individually indicated to be incorporated by reference.

What is claimed is:

1. A fishing bobber having a center of mass, comprising:
    an elongate shaft having a first end, an opposing second end, and a longitudinal axis extending therebetween;
    an aperture at the first end configured to engage a fishing line;
    a counterweight float disposed proximate the second end and fixedly attached to the elongate shaft; and
    an axially movable primary float disposed on the elongate shaft between the first end and the second end;
    wherein the primary float defines a pivot axis extending therethrough perpendicular to the longitudinal axis.

2. The fishing bobber of claim 1, wherein the elongate shaft includes a first portion and a second portion, the first portion defined as being between the first end and the primary float and the second portion defined as being between the second end and the primary float.

3. The fishing bobber of claim 1, wherein the counterweight float is buoyant in water.

4. The fishing bobber of claim 1, wherein the pivot axis is axially movable along the longitudinal axis of the elongate shaft.

5. The fishing bobber of claim 1, wherein the elongate shaft is configured to rotate about the pivot axis between a generally horizontal position and a generally vertical position.

6. The fishing bobber of claim 5, wherein the elongate shaft is configured to rotate about the pivot axis in response to a force applied at the first end.

7. The fishing bobber of claim 6, wherein the second end of the elongate shaft rotates upward as the elongate shaft moves from the generally horizontal position to the generally vertical position.

8. The fishing bobber of claim 6, wherein axially moving the primary float along the elongate shaft closer to the counterweight float reduces the force applied at the first end required to rotate the elongate shaft about the pivot axis to the generally vertical position.

9. The fishing bobber of claim 1, wherein the primary float is slidably disposed on the elongate shaft.

10. The fishing bobber of claim 1, wherein the primary float is rotatably disposed on the elongate shaft.

11. The fishing bobber of claim 10, wherein the elongate shaft is threaded.

12. The fishing bobber of claim 1, wherein axially moving the primary float along the elongate shaft shifts the pivot axis along the longitudinal axis relative to a center of mass of the fishing bobber.

13. The fishing bobber of claim 12, wherein axially moving the primary float closer to the center of mass increases sensitivity of the fishing bobber to a strike by a fish.

14. The fishing bobber of claim 1, wherein the elongate shaft, the counterweight float, and the primary float cooperate to eliminate buoyancy in indicating a strike on a fishing line engaged with the aperture.

15. A fishing bobber, comprising:
    an elongate shaft having a first end and a counterweight float fixedly attached thereto at an opposing second end; and
    a pivot float sized to support a bait or lure attached to a fishing line engaged with the elongate shaft, the pivot float defining a pivot axis movable along the elongate shaft;
    wherein the pivot float defines a first portion of the elongate shaft between the first end and the pivot float and a second portion of the elongate shaft between the second end and the pivot float, further wherein the first portion is longer than the second portion;
    wherein the counterweight float is sized and weighted to cooperate with the pivot float to offset a combined weight of the first portion of the elongate shaft and the bait or lure when situated in water, thereby establishing a center of mass at the pivot axis, wherein the primary float defines a pivot axis extending therethrough perpendicular to the longitudinal axis.

16. The fishing bobber of claim 15, wherein, when situated on a surface of the water, the pivot float has a first maximum radial extent measured from the elongate shaft in a direction normal to the surface of the water and the counterweight float has a second maximum radial extent measured from the elongate shaft in a direction normal to the surface of the water;
wherein the second maximum radial extent is greater than the first maximum radial extent.

17. The fishing bobber of claim 15, wherein when situated on a surface of the water, the second end is positioned an equal or greater distance above the surface of the water than the pivot axis.

18. The fishing bobber of claim 17, wherein, when situated on a surface of the water, the first end is positioned at or below the surface of the water and the second end is positioned above the surface of the water.

\* \* \* \* \*